July 15, 1952 U. A. MOORES 2,603,365
LOG LOADING AND UNLOADING APPARATUS
Filed June 1, 1949 4 Sheets-Sheet 2
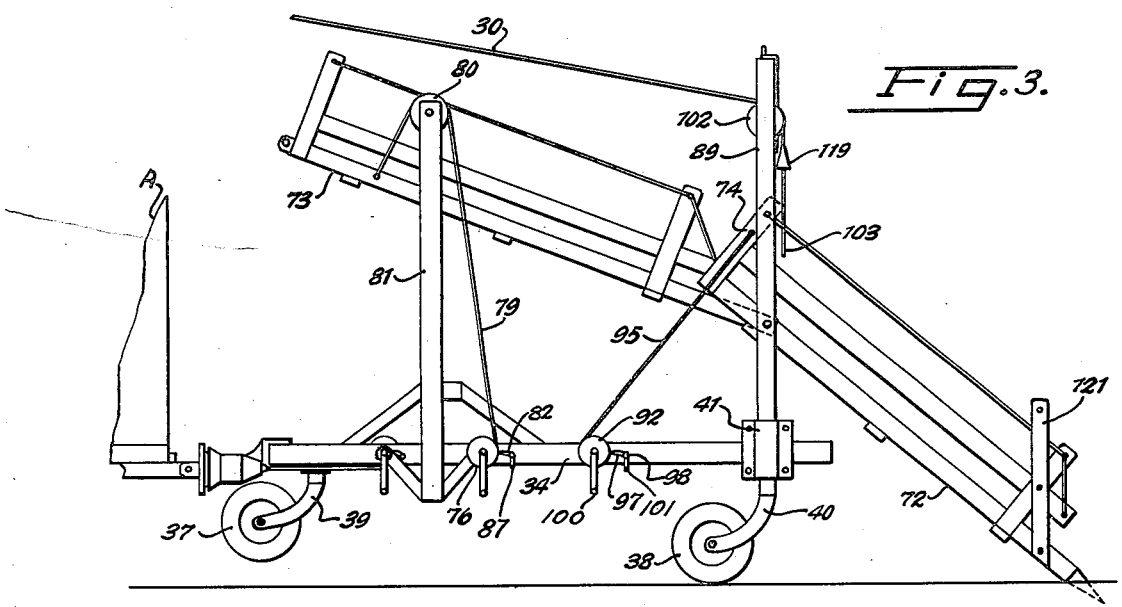
Fig. 3.
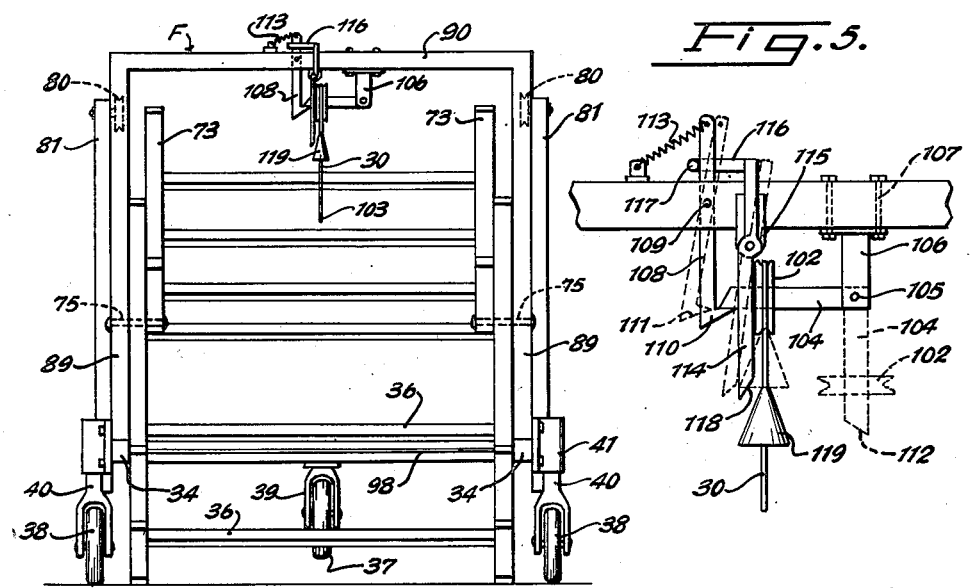
Fig. 5.
Fig. 4.
Inventor
URBAN A. MOORES.
By Shoemaker & Mattare
ATTORNEYS

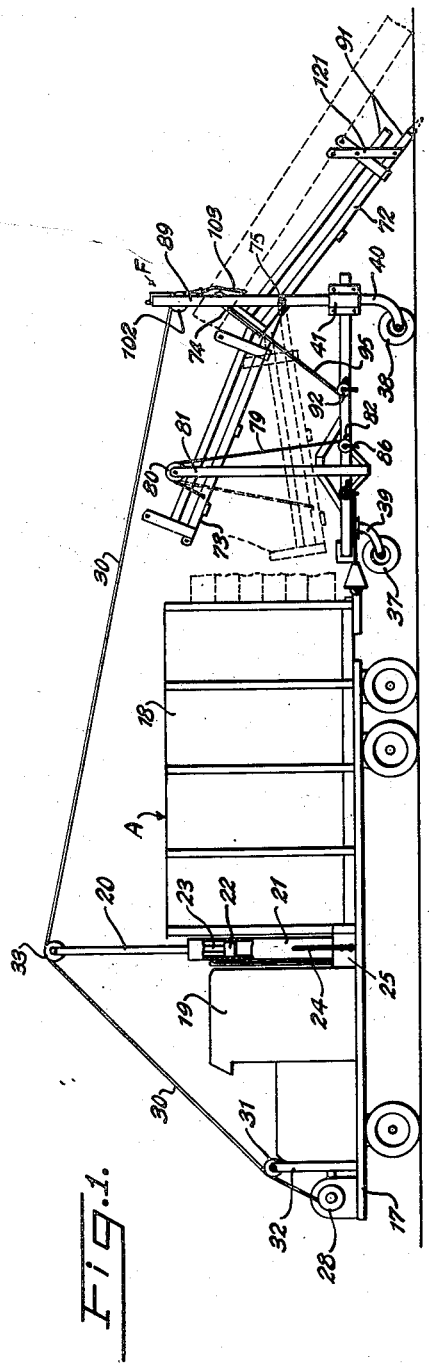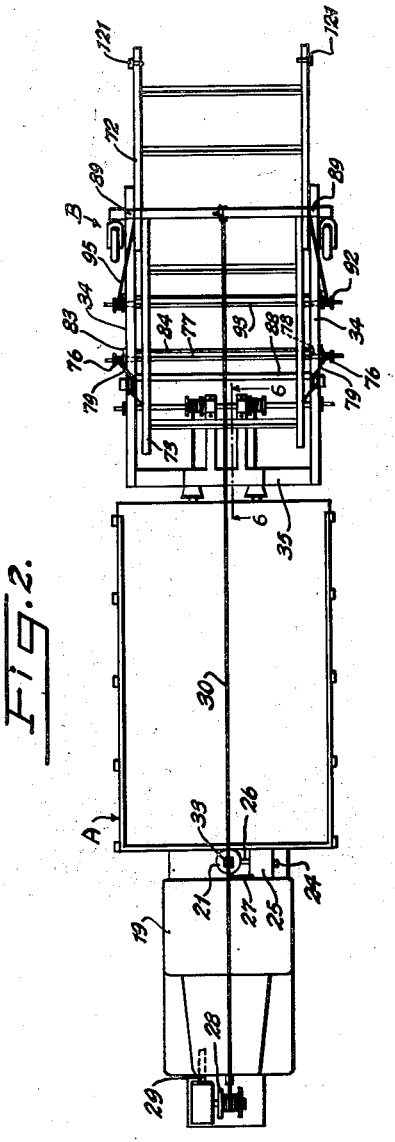

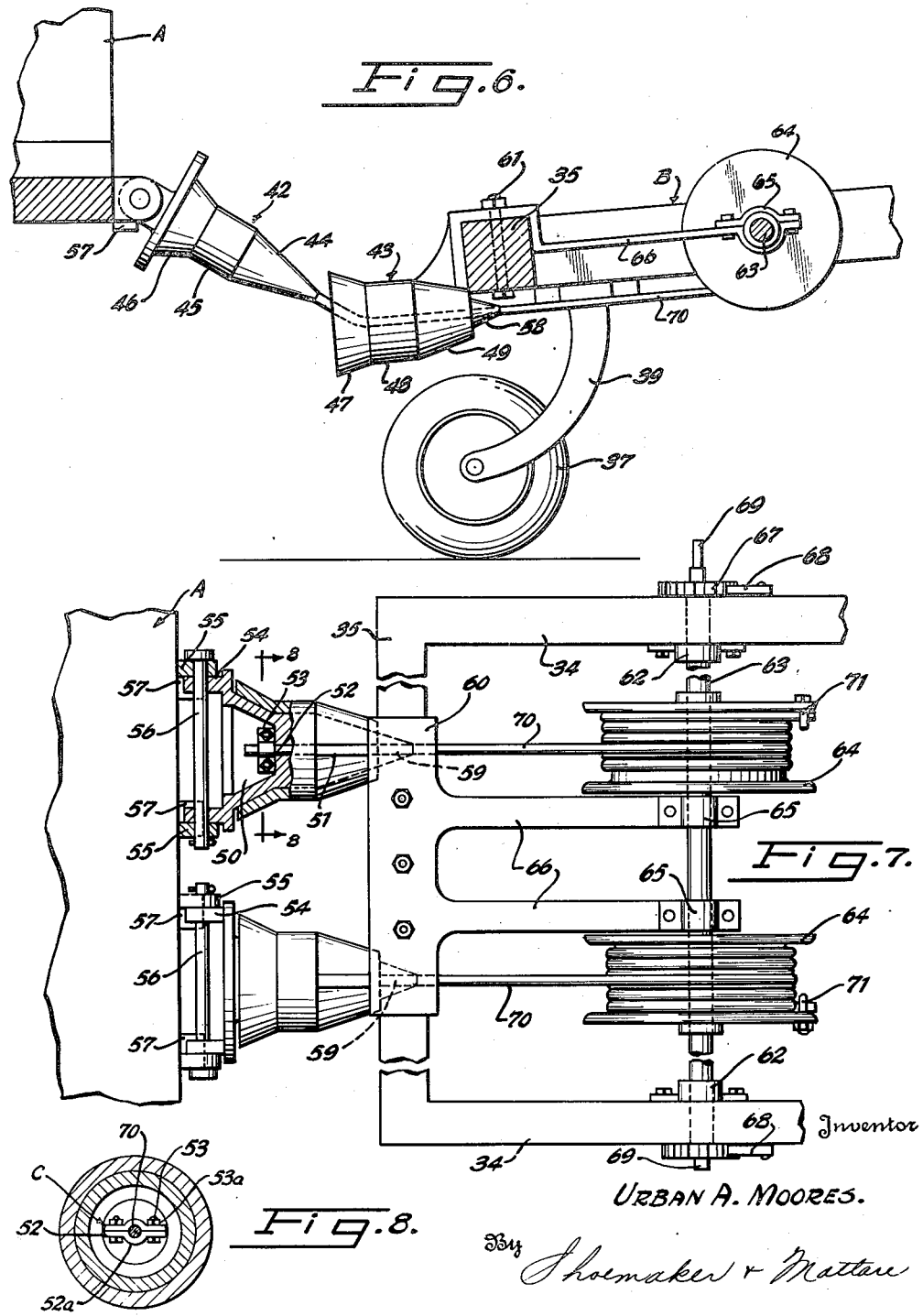

July 15, 1952 U. A. MOORES 2,603,365
LOG LOADING AND UNLOADING APPARATUS
Filed June 1, 1949 4 Sheets-Sheet 4
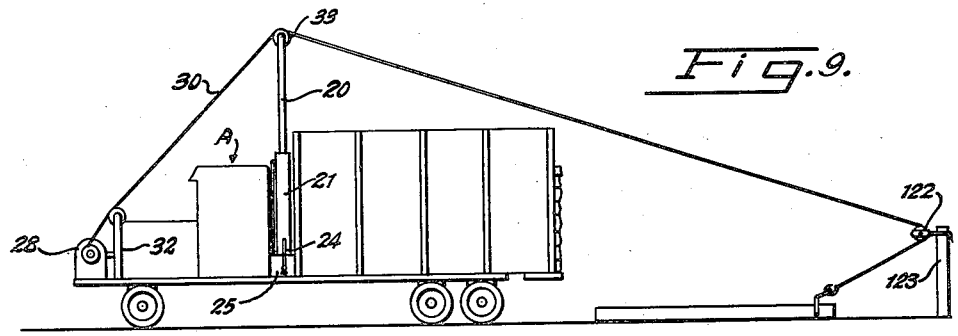
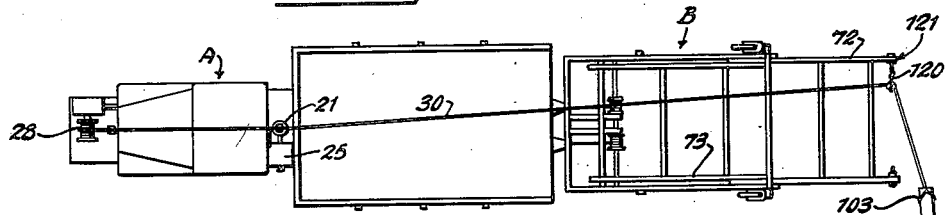
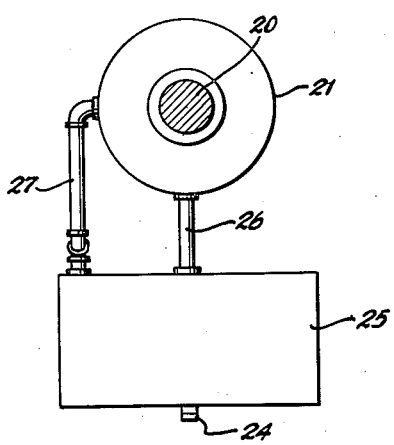
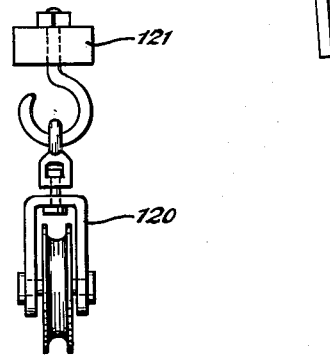
Inventor
URBAN A. MOORES.
By Shoemaker & Mattare
ATTORNEYS Patented July 15, 1952

2,603,365

UNITED STATES PATENT OFFICE 2,603,365

LOG LOADING AND UNLOADING APPARATUS

Urban A. Moores, Togus, Maine

Application June 1, 1949, Serial No. 96,489

10 Claims. (Cl. 214—41)

This invention relates to improvements in log loading and unloading apparatus and more particularly has to do with an improved apparatus for pulling in logs from distant points to and loading the same on a log transporting truck, and for unloading logs therefrom.

A primary object of the invention is to provide an improved log loading apparatus by which logs on the ground in no particular alignment, dingled logs and logs right from the stump can be expeditiously pulled in from distant points to and loaded on a log transporting truck.

Another object of the invention is to provide an improved log loading and unloading apparatus of the character referred to that can be readily moved from place to place, that can be quickly readied for operation, and which can be easily operated.

Another object of the invention is to provide a log loading and unloading apparatus of the kind mentioned that will be comparatively inexpensive in construction and within the means of the small operators who cannot afford the more expensive log loading equipment.

The invention comprehends a log transporting truck and a wheeled vehicle adapted to be hitched to the log transporting truck and having means thereon to facilitate the transfer of logs from the ground thereonto and for skidding logs therealong into the body of the log transporting truck, the apparatus including cable means for hauling in the logs to the wheeled loading vehicle, and along the same into the log transporting truck.

Another object of the invention is to provide improved ramp means on the wheeled log loading vehicle to facilitate skidding logs along the same and into the body of the log transporting truck.

A further object of the invention is to provide cable supporting means on the wheeled log loading vehicle at the rear thereof providing for sharply raising logs from the ground over a ramp at the rear of the wheeled loading vehicle and adapted to be automatically tripped to release the hauling cable therefrom after a log has been pulled in and lifted over said rear ramp whereby the log is dropped onto said ramp and upon a continued pull on the cable, the log will be pulled along the wheeled loading vehicle into the body of the log transporting truck.

Still another object of the invention is to provide simple, efficient, easily operable means for hitching the log loading truck to the log transporting truck and drawing the latter and the transporting truck quickly together with precision and into perfect alignment.

The invention, with other objects, novel features, and advantages thereof, and the particular construction, combinations and arrangements of parts comprising the same will be understood from the following detail description when considered in connection with the accompanying drawings forming part hereof and illustrating one embodiment of the invention.

In the drawings:

Fig. 1 is a side elevation of a log loading and unloading apparatus constructed in accordance with the present invention, a log being shown in position over the rear ramp just prior to the tripping of the cable supporting means at the rear of the wheeled loading vehicle.

Fig. 2 is a top plan view of the apparatus.

Fig. 3 is a fragmentary side elevation on an enlarged scale.

Fig. 4 is a rear elevation to an enlarged scale.

Fig. 5 is a detail rear end elevation of the cable supporting means and trip mechanism therefor at the rear of the wheeled log loading vehicle.

Fig. 6 is a detail longitudinal section to an enlarged scale on the line 6—6 of Fig. 2.

Fig. 7 is a top plan view of the construction shown in Fig. 6.

Fig. 8 is a detail transverse section on the line 8—8 of Fig. 7.

Fig. 9 is a side elevation of the log transporting truck with the hauling cable arranged in engagement with a pulley block on a land anchor for unloading logs from the truck.

Fig. 10 is a top plan view of the apparatus with the hauling cable engaged with a pulley block on one side of the log loading vehicle at the rear thereof for pulling in logs located to one side of the apparatus.

Fig. 11 is a detail view, on an enlarged scale, of the pulley block on the side of the wheeled loading vehicle at the rear thereof.

Fig. 12 is a detail view, on an enlarged scale, of the hydraulic hoisting means for the supporting mast for the log hauling cable.

While a preferred embodiment of the invention is illustrated in the drawings, it will be understood that minor changes and modifications may be made in the particular construction shown, and the invention may be embodied in other forms as will appeal to those skilled in the art and falling within the scope of the appended claims without departing from the spirit of the invention.

Referring to a detailed description of the particular embodiment of the invention illustrated in the drawings, A designates generally a log transporting motor-propelled truck and B a wheeled log loader vehicle or truck adapted to be hitched to the log transporting truck. The log transporting truck A is shown as including a chassis 17, a body 18 and a cab 19. In accordance with the present invention, a hoisting mast 20 is provided on the log transporting truck A at the forward part thereof, the same being shown located in a space between the body 18 and the cab 19. The hoisting mast 20 is vertically adjustable, the same being mounted on a hydraulic hoist comprising a cylinder 21 containing a piston 22 having a rod 23 to which the lower end of the mast is fixedly secured. A control lever 24 on the chassis 17 is associated with a conventional, positive hydraulic control box 25 controlling the vertical adjustment of the mast 20. Flexible pipe connections 26 and 27 extend from the control box 25 to opposite ends of the cylinder 21. As will be understood, the piston 22 will be shifted upwardly or downwardly in the cylinder 21 depending upon whether fluid under pressure is being admitted into the same through the pipe connection 26 or the pipe connection 27 and that such admission of operating fluid is controlled by the lever 24 to position and maintain the piston in any desired position of adjustment in the cylinder.

On the log transporting truck A at the forward end thereof is a conventional cable traction power winch 28, which is driven through a connection 29 with the usual transmission power take-off shaft of the motor of the log transporting truck A. Extending forwardly from the winch 28 is a cable 30 that is trained over a pulley 31 on the upper end of an adjacent upright 32 on the chassis 17 and a pulley 33 on the upper end of the mast 20.

The wheeled log loader vehicle or truck B is shown as comprising a rectangular frame having longitudinal side bars 34 and front and rear transverse bars 35 and 36, the frame being supported by a front caster wheel 37 and rear casters 38 having respectively shanks 39 and 40 mounted in bearings 41 secured to the side bars 34 of the frame. As shown, the shank 39 of the front caster wheel 37 is shorter than the shanks 40 of the rear casters 38 so that the frame is supported at a forward downward inclination as shown in Fig. 6 when the log loader truck B is not hitched to the log transporting truck A.

Means for hitching the log loader vehicle or truck B to the transporting truck A is provided whcih has combined therewith means for drawing the two trucks together into perfect alignment. Referring particularly to Figs. 6 and 7 of the drawings, said means includes two pairs of aligning members 42 and 43 of general conical shape adapted to fit one within the other, the male members 42 being connected with the chassis 17 of the log transporting truck, and the female members 43 being mounted on the forward end of the log loader vehicle B. Each of the male members 42 has a forward conical part 44, an intermediate cylindrical part 45 and a rear conical part 46, the female aligning members 43 being correspondingly shaped, each having a conical shaped part 47, an intermediate cylindrical part 48 and a rear conical part 49.

The male aligning members 42 each have an interior chamber 50 extending inwardly from the rear end thereof, and a central longitudinal passage 51 leading from its forward end to said chamber 50. Arranged to fit within the chamber 50 of each of the male aligning members is cable clamping means shown in the drawings as a split clamp generally designated C, the same comprising two oppositely disposed plates 52 drawn together by bolts 53 and nuts 53ª, each of the plates 52 having a concave cable engaging inner face portion 52ª centrally of the ends thereof. When the clamps C have been attached to the ends of the cables 70, the latter are tightened so that the clamps C abut against the inner end walls of the chamber 50 of the male aligning members 42 as shown in Fig. 7 of the drawings. The male aligning members 42 each are provided with a pair of apertured attaching lugs 54 projecting from the rear end thereof to fit between a pair of spaced apertured lugs 55 projecting from the rear end of the chassis 17 of the log transporting truck A, said male aligning members being connected to the chassis 17 for vertical pivotal movement by bolts 56 extending through the apertures of the pairs of lugs 54 and 55. 57 designates stop portions projecting rearwardly from the chassis 17 between the spaced lugs 55 to abut against the underside of the attaching lugs 54 on the male aligning members 42 and limit the downward movement thereof.

The female aligning members 43 each have at their rear ends a solid portion 58 provided with a central longitudinal passage 59 leading from the rear end of said aligning members to the interior thereof. The female aligning members 43 are rigidly secured to an L-shaped bracket 60 which fits over the front bar 35 of the frame of the wheeled log loader truck B and is secured thereto by bolts 61. Mounted for rotation in bearings 62 on the side bars 34 of the frame, is a transverse shaft 63 on which are fixed drums 64 located in longitudinal alignment with the female aligning members 43. The shaft 63 is also shown supported intermediate its ends in bearings 65 on the ends of arms 66 on the bracket 60.

On the shaft 63, near each end thereof, is a ratchet 67, the ratchets being engaged by pawls 68 mounted on the side bars 34 of the frame. The shaft 63 has end portions 69 formed with angularly related faces for engagement with the socket of a hand crank (not shown) for revolving the shaft.

On each of the drums 64 is a cable 70, one end of the cable being suitably secured to the drum as by a clamp 71. The free end of each cable extends through the passage 59 of one of the female aligning members 43 and through the same beyond the front end thereof.

When it is desired to couple the log loader vehicle or truck B to the log transporting truck A, the free end of each of the cables 70 is passed into the longitudinal passage 51 of the appropriate male aligning member 42 from the forward end thereof to the interior chamber 50 and secured therein by attaching one of the clamps C on the end of the cable. Drum 64 is now rotated by means of shaft 63 to shorten the length of the end portions of the cables extending from the drum. The male members 42 are drawn into precise alignment with the female members 43. These members 42 and 43 are drawn tightly together and held in tight engagement by the pawls 68 cooperating with the ratchets 67 on the shaft 69 to lock the shaft with the cables tightened, the forward caster 37 being raised completely clear of the highway when the log loader vehicle is thus coupled to the truck A in towing position.

When the log loader vehicle thus coupled to the truck A has been towed to the vicinity at which the logs are to be loaded on the truck A, the truck A and loader vehicle B are simply backed in close proximity to the logs and the apparatus is ready for the loading operations.

As will be understood, when the truck A has been loaded, the loader vehicle B may be easily disconnected from the truck A by simply releasing the pawls 68, loosening the cables 70 and removing the clamps C.

On the log loader vehicle or truck B are two ramps 72 and 73, the ramp 72 extending rearwardly from the rear end thereof, and the ramp 73 extending forwardly from the rear end to the forward end thereof. The ramps 72, 73 are pivotally connected to uprights 89 on the vehicle frame at opposite sides thereof by bolts 75 for vertical angular adjustment, the forward ramp 73 being connected to the uprights 89 at its rear end, and the rear ramp 72 being connected to said uprights a short distance rearwardly from its forward end and overlapping the rear end of the forward ramp 73.

Means for adjusting the forward ramp 73 is provided comprising drums 76 mounted on a transverse rotary shaft 77 journaled in bearings 78 on the side bars 34 of the vehicle frame. Extending from the drums 76 are cables 79 trained over pulleys 80 on the upper ends of oppositely disposed standards 81 on the side bars 34, the cables being connected to the ramp at the forward part thereof at opposite sides. On the shaft 77 are ratchets 82 that are engaged by pawls 83, the latter being fixed on a rotary shaft 84 journaled in bearings 85 on the side bars 34 of the frame. 86 and 87 designate respectively hand cranks on each end of the shafts 77 and 84.

In Fig. 1 of the drawings, the forward ramp 73 is shown in dotted lines extending at a forward downward inclination with its forward end resting upon a transverse bar 88 secured to the standards 81 a short distance above the level of the bottom of the body 18 of the log transporting truck A. This is the position to which the forward ramp 73 is adjusted at the beginning of loading the log transporting truck A. As the loading operation proceeds and the pile of logs in the body of the log transporting truck increases in height, the forward ramp 73 is raised accordingly.

For vertically adjusting the rear ramp 72, means is provided comprising drums 92 fixed on a rotary transverse shaft 93 mounted in bearings 94 on the side bars 34 of the log loader vehicle frame. From the drums 92 extend cables 95 that are connected to the vertical side bars 74 of the tail ramp 72. On the shaft 93 are ratchets 96. Pawls 97, to engage the ratchets 96, are fixed on a rotary transverse shaft 98 mounted in bearings 99 on the side bars 34 of the vehicle frame. 100 and 101 are hand cranks on opposite ends of the shafts 93 and 98. As will be understood, the tail ramp 72 is adapted to be adjusted to the position illustrated in Fig. 1 with its rear end engaging the ground when it is desired to load logs onto the log transporting vehicle A. As shown, the lowermost of the side bars 91 of the ramp 72 are provided with pointed end portions to enter the ground and anchor the log loading vehicle in position.

Referring now particularly to Figs. 4 and 5 of the drawings, the uprights 89 are connected at their upper ends by a cross bar 90, which forms therewith an inverted U-shaped frame designated F. On the cross bar 90 of the inverted U-shaped frame F, at the underside of the said cross bar about midway the ends thereof, is a pulley 102 for supporting the cable 30, the latter being trained over said pulley 102 and thence extending rearwardly therefrom during the operation of drawing in logs to and over the rear ramp 72, the cable 30, at its free end, being provided with a grapple 103 of conventional form for connecting the cable to the logs. The pulley 102 is movably mounted on the cross bar 90 whereby the same can be automatically tripped to release the cable 30 from engagement therewith when a log has been pulled in and lifted over the rear ramp 72 and so that the log is dropped onto the rear ramp and can be pulled from the tail ramp 72 over the forward ramp 73 and into the body 18 of the log transporting vehicle A. The pulley 102 is rotatably mounted upon a short shaft 104, which is pivotally connected at one end at 105 to the lower end of a bracket 106 secured to the cross bar 90 of the frame F by bolts 107. The pulley shaft 104 is adapted to be supported to extend horizontally as shown in full lines in Fig. 5 by a dog or latch 108 pivoted intermediate its ends at 109 on the cross bar 90 and having a laterally projecting tooth 110 at its lower end adapted to be engaged with the outer end of the pulley shaft 104 at the underside thereof, said tooth having a beveled bottom face 111, and the outer end of the pulley shaft 104 having a beveled face 112 to cooperate with the beveled bottom face 111 of the tooth 110 to facilitate the engagement and disengagement of the outer end of the pulley shaft 104 with the dog or latch 108.

A coiled spring 113 connected at one end to the cross bar 90 and connected at its other end to the upper end of the dog or latch 108, exerts tension thereon to urge its lower end with the tooth 110 toward the right in Fig. 1 to maintain the tooth 110 of the dog or latch in supporting engagement with the outer end of the pulley shaft 104. 114 is a lever for tripping the dog or latch 108. This trip lever 114, which is pivotally mounted intermediate its ends to a bracket 115 on the cross bar 90, has at its upper end a laterally extending arm 116 provided at its outer end with a shoulder 117 disposed at one side of the upper end of the dog or latch 108, in the plane of movement thereof, so that, when the lower end of the trip lever 114 is moved to its dotted line position, the shoulder 117 engages the upper portion of the dog or latch 108 and swings the same laterally so that the tooth 110 at the lower end thereof is moved out of engagement with the outer end of the pulley shaft 104 and the latter is released and pivots downwardly to the dotted line position.

The tripping lever 114, at its lower end, has a beveled face 118 to cooperate with a conical tappet 119 that is suitably secured, as by welding, to the cable 30. The tappet 119 is located on the cable 30 the appropriate distance from the grapple 103 on the outer end of the cable so that the tappet 119 will engage and actuate the trip lever 114 when the log that is being drawn in has been lifted over the rear ramp 72.

As will be understood, after the log has been hauled in over the ramp 73 into the log transporting truck body 18, the cable 30 is re-engaged with the pulley 102 and the latter reset in horizontal position with its outer end in supporting engagement with the dog or latch 108 for another operation.

In the use of the apparatus, the cable 30 is run out from the rear end of the tail ramp 72 to the point where the logs are located, the cable is fastened to a log through the grapple 103 and the power winch 28 is then operated to pull the log to and lift the same over the tail ramp, the log being dropped to the tail ramp when the pulley 102 is tripped, and the log thereafter being drawn from the tail ramp 72 over the forward ramp 73 and into the body 18 of the log transporting truck A.

The frame F, at the rear of the log loader vehicle, with the cable supporting pulley 102, provides for sharply raising the logs over and dropping the same onto the tail ramp 72 from which the logs may be readily skidded over the forward ramp 73 and into the body 18 of the log transporting truck, the mast 20 being advantageously located directly in front of the body 18 of the log transporting truck facilitating the piling of the logs one upon another into the truck body and being vertically adjustable so that, as the pile of logs in the truck body increases in height, the mast 20 can be gradually raised and the line of haul and lift of the cable changed accordingly, whereby the loading operation can be expeditiously and satisfactorily accomplished.

An emergency pulley block 120 is provided on the tail ramp 72 at the rear end thereof at one side for use in pulling in logs that lie to one side of the tail ramp. The emergency pulley block 120 is pivotally connected to an upright 121 secured to the longitudinal side bars 91 of the tail ramp 72. When the emergency pulley block 120 is to be employed, the grapple 103 is removed from the cable 30, the cable being threaded through the pulley block 120 and the grapple 103 again attached to the cable, the latter being run out to one side of the tail ramp 72 as illustrated in Fig. 10 of the drawings. While only one emergency pulley block 120 is shown at one side of the tail ramp 72, it will be understood that an emergency pulley block may be provided at each side of the tail ramp.

When logs are to be unloaded from the log transporting truck A, a pulley block 122 is mounted on an anchorage post 123 provided in rear of the log transporting truck, the cable 30 being engaged with the pulley block 122 as illustrated in Fig. 10 of the drawings, the logs being individually pulled from the truck by fastening the cable thereto.

I claim:

1. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a ramp located rearwardly of the log transporting truck, a frame at the forward part of the ramp having a part extending upwardly at one side thereof and a portion extending transversely from the upper end of said upwardly extending part over the ramp, a bracket on said transversely extending portion of the frame, a shaft connected at one end to said bracket for pivotal movement in a vertical plane, a pulley on said shaft, a latch mounted on the transversely extending portion of said frame adapted to engage the free end of said shaft to hold the same in horizontal position with the pulley in cable-supporting position, and means for automatically tripping said latch to disengage said pulley from the cable, said means including a tappet on the free end portion of the cable.

2. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a ramp located rearwardly of the log transporting truck, an inverted substantially U-shaped frame at the forward part of the ramp, said frame being disposed transversely of the ramp with its sides extending at the sides thereof and its intermediate upper portion bridging the same, a bracket on said intermediate upper portion of the frame, a shaft connected at one end to said bracket for pivotal movement in a vertical plane, a pulley on said shaft, a latch mounted on the upper part of said frame adapted to engage the free end of said shaft to hold the same in horizontal position with the pulley in cable-supporting position, and means for automatically tripping said latch to disengage said pulley from the cable, said means including a tappet on the free end portion of the cable.

3. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a ramp located rearwardly of the log transporting truck, a frame at the forward part of the ramp having a part extending upwardly at one side thereof and a portion extending transversely from the upper end of said upwardly extending part over the ramp, a bracket on said transversely extending portion of the frame, a shaft connected at one end to said bracket for pivotal movement in a vertical plane, a pulley on said shaft, a latch mounted on the transversely extending portion of said frame adapted to engage the free end of said shaft to hold the same in horizontal position with the pulley in cable-supporting position, and means for automatically tripping said latch to disengage the pulley from the cable, said means including a lever pivotally connected with the transversely extending portion of said frame, and a tappet on the free end of the cable adapted to actuate said lever.

4. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a ramp located rearwardly of the log transporting truck, a frame at the forward part of the ramp having a part extending upwardly at one side thereof and a portion extending transversely from the upper end of said upwardly extending part over the ramp, a bracket on said transversely extending portion of the frame, a shaft connected at one end to said bracket for pivotal movement in a vertical plane, a pulley on said shaft, a latch mounted on the transversely extending portion of said frame adapted to engage the free end of said shaft to hold the same in horizontal position with the pulley in cable-supporting position, and means for automatically tripping said latch to disengage the pulley from the cable, said means including a lever connected with the transversely extending portion of said frame for pivotal movement in a vertical plane and having a beveled face at its lower end, and a tappet on the free end of the cable adapted to engage the beveled face of said lever to actuate the same.

5. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a ramp located rearwardly of the log transporting truck, a frame at the forward part of the ramp having a part extending upwardly at one side thereof and a portion extending transversely from the upper end of said upwardly extending part over the ramp, a bracket on said transversely extending portion of the frame, a shaft connected at one end to said bracket for pivotal movement in a vertical plane, a pulley on said shaft, a latch connected with the transversely extending portion of said frame for pivotal movement in a vertical plane and having a laterally extending portion at its lower end to engage the free end of said shaft to hold the same in horizontal position with the pulley in cable-supporting position, a spring acting on the latch to urge the same laterally to shaft-engaging position, and means for automatically tripping said latch to disengage the pulley from the cable, said means including a lever connected with the transversely extending portion of the frame for pivotal movement in a vertical plane and having a laterally extending arm at its upper part adapted to engage the latch, and a tappet on the free end portion of the cable adapted to engage said lever at its lower end to actuate the lever against the pressure of said spring to trip the latch.

6. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a ramp located rearwardly of the log transporting truck, a frame at the forward part thereof having a part extending upwardly at one side thereof and a portion extending transversely from the upper end of said upwardly extending part over the ramp, a bracket on said transversely extending portion of the frame, a shaft connected at one end to said bracket for pivotal movement in a vertical plane, a pulley on said shaft, a latch connected intermediate its ends with the transversely extending portion of said frame for pivotal movement in a vertical plane and having a laterally extending portion at its lower end to engage the free end of said shaft to hold the same in horizontal position with the pulley in cable-supporting position, a spring engaging the latch at its upper end to urge the same to shaft-engaging position, and means for automatically tripping the latch to disengage the pulley from the cable, said means including a lever pivotally connected intermediate its ends with the transversely extending portion of the frame for pivotal movement in a vertical plane and having a laterally extending arm at its upper part adapted to engage the latch, and a tappet on the free end portion of the cable adapted to engage said lever at its lower end to actuate the lever to trip the latch.

7. In a log loading and transporting apparatus, a motor-propelled log transporting truck including a chassis and a log carrying body thereon, cable traction means on the chassis forwardly of said log carrying body, a wheeled log loader vehicle, a ramp on the log loader vehicle extending rearwardly from the rear end thereof, a forward ramp on the log loader vehicle extending forwardly from the rear end to the forward end thereof, and means for coupling the wheeled log loader vehicle to the log transporting truck.

8. In a log loading and transporting apparatus, a motor-propelled log transporting truck including a chassis and a log carrying body thereon, cable traction means on the chassis forwardly of said log carrying body, a wheeled log loader vehicle, a ramp on the wheeled log loader vehicle extending from the rear end to the forward end thereof and pivotally connected at its rear end to the rear end portion of the same for vertical angular adjustment, means for vertically adjusting said ramp, a ramp extending rearwardly from the rear end of the log loader vehicle and pivotally connected at its forward portion to the rear end of the log loader vehicle for vertical angular adjustment, means for vertically adjusting said last mentioned ramp, and means for coupling said log loader vehicle to the log transporting truck.

9. In a log loading and transporting apparatus, a motor-propelled log transporting truck including a chassis and a log carrying body thereon, cable traction means on the chassis forwardly of said log carrying body, a wheeled log loader vehicle, a ramp on the wheeled log loader vehicle extending from the rear end to the forward end thereof and pivotally connected at its rear end to the rear end portion of the same for vertical angular adjustment, means for vertically adjusting said ramp, a ramp extending rearwardly from the rear end of the log loader vehicle and pivotally connected at its forward part rearwardly of its forward end to the rear end of the log loader vehicle in overlapping relation with the first mentioned ramp for vertical angular adjustment, means for vertically adjusting said rear ramp, and means for coupling said log loader vehicle to the log transporting truck.

10. In a log loading and transporting apparatus, a log transporting truck including a chassis and a log carrying body thereon, a mast on the chassis forwardly of said body having a pulley mounted on the upper end thereof, cable traction means on the chassis forwardly of said mast, a cable extending rearwardly from said cable traction means trained over said pulley and having means at its free end for connecting the same to a log, a wheeled log loader vehicle, means for hitching said vehicle to said truck, a ramp extending rearwardly from the log loader vehicle, an inverted substantially U-shaped frame on the log loader vehicle at the rear thereof, said frame being disposed transversely of the ramp with its sides extending at the sides thereof and its intermediate upper part bridging the same, a bracket on said intermediate upper part of the frame, a shaft connected at one end to said bracket for pivotal movement in a vertical plane, a pulley on said shaft, a latch mounted on the upper part of said frame adapted to engage the free end of said shaft to hold the same in horizontal position with the pulley in cable-supporting position, and means for automatically tripping said latch to disengage said pulley from the cable, said means including a tappet on the free end portion of the cable.

URBAN A. MOORES.

REFERENCES CITED

The following references are of record in the file of this patent:

UNITED STATES PATENTS

| Number | Name | Date |
| --- | --- | --- |
| 432,680 | Van Eman | July 22, 1890 |
| 680,949 | Jacobs | Aug. 20, 1901 |
| 1,027,356 | Osborn | May 21, 1912 |
| 1,276,222 | Hugunin | Aug. 20, 1918 |
| 2,088,828 | Winston | Aug. 3, 1937 |
| 2,120,637 | Van Doorne | June 14, 1938 |
| 2,215,631 | Young | Sept. 24, 1940 |
| 2,321,198 | Graves | June 8, 1943 |
| 2,459,731 | Wymore | Jan. 18, 1949 |

FOREIGN PATENTS

| Number | Country | Date |
| --- | --- | --- |
| 527,542 | France | Oct. 26, 1921 |
| 82,939 | Sweden | Mar. 19, 1935 |